(12) United States Patent
Ryu et al.

(10) Patent No.: US 6,791,731 B2
(45) Date of Patent: Sep. 14, 2004

(54) MICRO-OPTICAL SWITCH AND METHOD FOR MANUFACTURING THE SAME

(75) Inventors: Ho Jun Ryu, Seoul (KR); Doo Young Hah, Seoul (KR); Chi Hoon Jun, Daejon-Shi (KR); Yun Tae Kim, Daejon-Shi (KR)

(73) Assignee: Electronics and Telecommunications Research Institute, Daejon-Shi (KR)

( * ) Notice: Subject to any disclaimer, the term of this patent is extended or adjusted under 35 U.S.C. 154(b) by 18 days.

(21) Appl. No.: 10/329,702

(22) Filed: Dec. 27, 2002

(65) Prior Publication Data

US 2004/0070806 A1 Apr. 15, 2004

(30) Foreign Application Priority Data

Oct. 15, 2002 (KR) ................................ 10-2002-0062750

(51) Int. Cl.[7] .............................................. G02B 26/08
(52) U.S. Cl. ...................... 359/224; 359/201; 359/198; 359/199; 359/900
(58) Field of Search ................................ 359/198–199, 359/201–202, 212–214, 223–224, 872, 900; 385/18; 310/36, 40 R, 46, 48, 66, 40 MM

(56) References Cited

U.S. PATENT DOCUMENTS 5,912,608 A * 6/1999 Asada ........................ 335/222

| 5,945,898 A | 8/1999 | Judy et al. |
| 6,295,154 B1 | 9/2001 | Laor et al. |

OTHER PUBLICATIONS

Hiroshi Toshiyoshi, et al.; Electromagnetic Torsion Mirrors for Self–Aligned Fiber–Optic Crossconnectors by Silicon Micromachining; IEEE Journal of Selected Topics in Quantum Electronics; vol. 5, No. 1; Jan./Feb. 1999; pp. 10–17.
Jack W. Judy, et al.; Magnetically Actuated, Addressable Microstructures; Journal of Microelectromechanical Systems; vol. 6, No. 3; Sep. 1997, pp. 249–256.

* cited by examiner

*Primary Examiner*—James Phan
(74) *Attorney, Agent, or Firm*—Jacobson Holman PLLC

(57) ABSTRACT

The present invention relates to a micro-optical switch and comprises an external frame having a plurality of holes inside; an internal frame positioned in the plurality of holes and having holes inside; light reflecting means positioned inside the holes of the internal frame; external magnetic substances positioned at both sides of the external frame; outside torsion hinge for connecting the external frame to the internal frame and having 45° to the magnetic field produced by the external magnetic substances; inside torsion hinge for connecting the internal frame to the light reflecting means and for being perpendicular to said outside torsion hinge; an outside coil wired in the internal frame; and an inside coil wired in the light reflecting means, and is characterized in that the light reflecting means and the internal frame are preferably rotated by the inside torsion hinge and the outside torsion hinge as an axis when a current is applied to the inside coil and the outside coil.

5 Claims, 4 Drawing Sheets

MICRO-OPTICAL SWITCH AND METHOD FOR MANUFACTURING THE SAME

BACKGROUND OF THE INVENTION

1. Field of the Invention

The present invention relates to the optical switch used in the optical communication system, especially to the micro-optical switch having fine mirror capable of biaxially rotating and the method for manufacturing the same.

2. Description of the Prior Art

As the demand for the optical communication network is explosively increasing, researches for MEMS (micro-electro-mechanical systems) type optical switches with all-optical structure capable of transmitting information with faster speed and larger capacity are being conducted. The MEMS means the technique for making the electromotive devices small-sized and integrated. This MEMS technique can manufacture the small-sized devices on a semiconductor wafer with precision using the processes like lithography, deposition, etching, etc, thereby has advantage in accomplishing the multifunction.

Most conventional MEMS type optical switches use electrostatic force, piezoelectric force, or thermal expansion force and require high driving voltage or power dissipation, and in the case of using the piezoelectric force, problems occur in reliability to the device characteristics.

Meanwhile, in the case of using the magnetic force, structure of the optical switch can be simple, and high drive force and displacement can be obtained. To date, The type of optical switch capable of moving uniaxially due to a limitation of structure using electrostatic force together or Lorentz force has been devised. For example, Hiroshi Toshoyoshi's "Electromagnetic Torsion Mirrors for Self-Aligned Fiber-Optic Crossconnectors by Silicon Micromachining" issued in January, 1999, "IEEE J. Select. Topics Quantum Electron" shows the micro-electro-mechanical optical switch that drive the torsion mirror using an electromagnetic force as a driving force. Such an optical switch provides the technical idea like that the optical switch uses the silicon fine processing and is aligned at a micro mirror using self-alignment method, and the micro mirror drive corresponding to the magnetic field produced by a permanent magnet.

To use the Lorentz force, the direction of the wires flowing the current and the direction of the magnetic field must be perpendicular each other, and to get the biaxial degree of freedom, magnetic fields are perpendicularly crossed each other. But this causes a problem that a proper force can not be applied to the wire due to an interaction of magnetic fields.

SUMMARY OF THE INVENTION

Thus, the object of the present invention is to provide a micro-optical switch capable of driving biaxially by the magnetic field in one direction using the torsion hinge with 45° to the magnetic field.

Other object of the present invention is to provide a method for manufacturing the micro-optical switch capable of driving biaxially by the magnetic field in one direction using the torsion hinge with 45° to the magnetic field.

To achieve the object, A micro-optical switch according to the present invention comprises, an external frame having holes inside; an internal frame positioned in the holes and also having the holes inside; a light reflecting means positioned inside the holes of the internal frame; external magnetic substances positioned at both sides of the external frame; outside torsion hinge for connecting the external frame to the internal frame and having 45° to the magnetic field produced by the external magnetic substances; inside torsion hinge for connecting the internal frame to the light reflecting means and for being perpendicular to said outside torsion hinge; outside coils wired in the internal frame; and inside coils wired in the light reflecting means, and the light reflecting means and the internal frame are preferably rotated by the inside torsion hinge and the outside torsion hinge as an axis when a current is applied to the inside coil and the outside coil.

To achieve the other object, A method for manufacturing the micro-optical switch according to the present invention preferably comprises, depositing the etching stopper film on the bottom surface of SOI wafer consisted of upper, medium, and lower layers; removing the etching stopper film except its region defining the external frame; depositing an insulating layer on the upper layer, and etching the insulating layer and the upper layer by using the mask defining the internal frame, light reflecting means, inside torsion hinge, and outside torsion hinge; forming the inside and outside coils on the insulating layer; depositing a protection layer on the upper surface of the structure formed by the aforementioned steps, and etching the lower layer using the etching stopper film as a mask; and removing the protection layer, and floating from the lower space of the SOI wafer the internal frame, light reflecting means, inside torsion hinge, and outside torsion hinge by etching the medium layer.

DESCRIPTION OF THE PREFERRED EMBODIMENT

Hereinafter, the embodiments of the present invention will be explained with reference to the accompanying drawings. However, these embodiments are provided to fully understand those skilled in the art and can be modified in variation, and the scope of the present invention is not limited to these embodiments.

Figure 1:
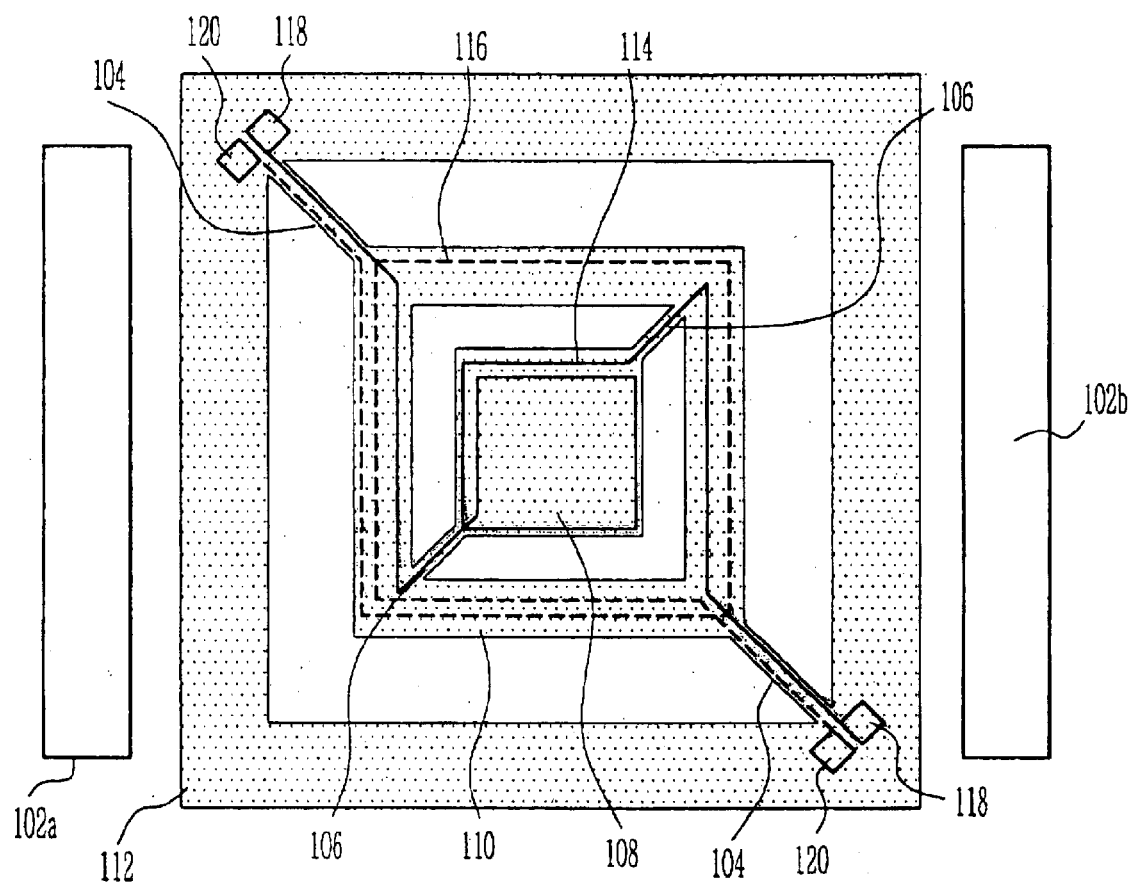
FIG. 1 shows a plane view for explaining the micro-optical switch in accordance with the preferred embodiment of the present invention.
Figure 2:
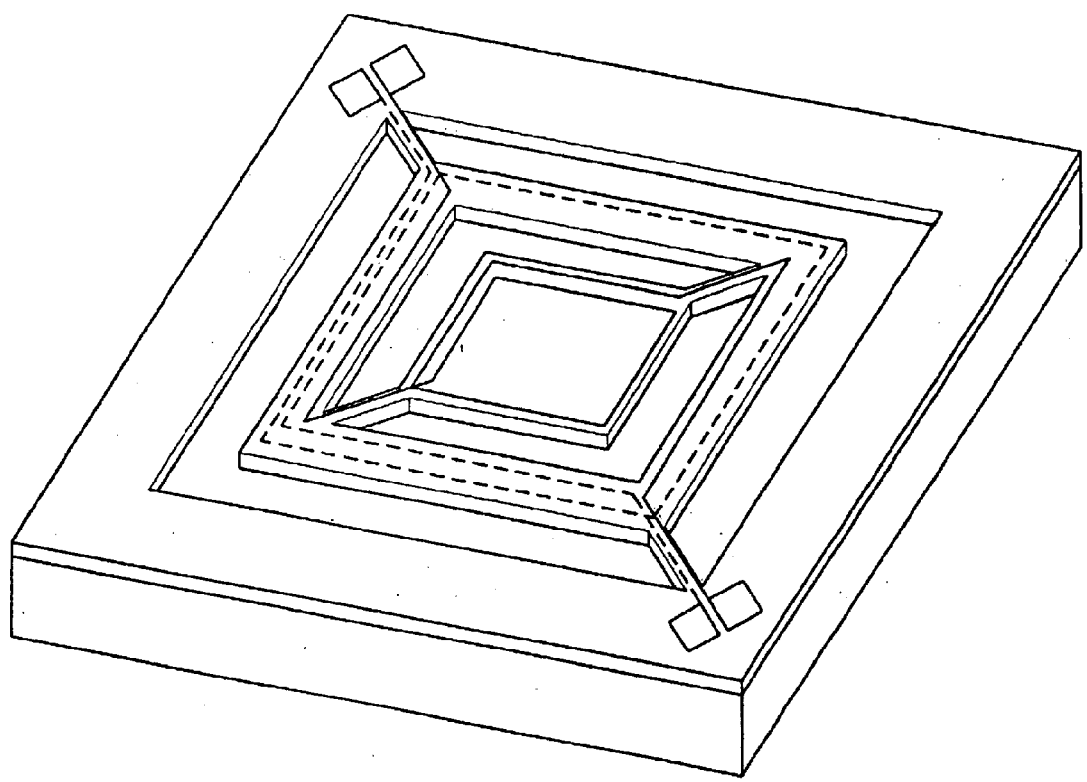
FIG. 2 shows a perspective view for explaining the micro-optical switch in accordance with the preferred embodiment of the present invention.

FIG. 1 shows an plane view for explaining the micro-optical switch according to the preferred embodiment of the present invention, and the micro-optical switch comprises external magnetic substances 102a, 102b, an outside torsion hinge 104, an inside torsion hinge 106, a light reflecting means 108, an internal frame 110, an external frame 112, an inside coil 114, an outside coil 116, an inside electrode pad 118 and an outside electrode pad 120. FIG. 2 shows a perspective view for explaining the micro-optical switch according to the preferred embodiment of the present invention.

The micro-optical switch is floated in the air to make the light reflecting means 108 rotated by the inside torsion hinge 106 as an axis, and the internal frame 110 around the light reflecting means 108 is floated in the air to be rotated by the outside torsion hinge 104 as an axis. The internal frame 110 is positioned inside the holes of an external frame 112 and connected to the external frame 112 by the outside torsion hinge 104. The internal frame 110 preferably has the shape of rectangle. The light reflecting means 108 is positioned in the holes of internal frame 110 and connected to the internal frame 110 by the inside torsion hinge 106. The light reflecting means 108 can be implemented as a micro mirror, and the plane of the light reflecting means is preferably rectangle. It is preferable for the outside torsion hinge 104 and inside torsion hinge 106 to have 45° as to the magnetic field produced by the external magnetic substances 102a, 102b in order to have the biaxial degree of freedom using magnetic forces. Also, to have the biaxial degree of freedom, it is preferable to make the outside torsion hinge 104 and the inside torsion hinge 106 being perpendicular. The outside coil 116 is positioned in the internal frame 110 through the outside torsion hinge 104 from the outside electrode pad 120. The inside coil 114 is positioned in the light reflecting means 108 through the outside torsion hinge 104 and the inside torsion hinge 106 from the inside electrode pad 118.

The principle of driving the micro-optical switch according to the preferred embodiment of the present invention will be explained in conjunction with the FIG. 1. If there exits a wire flowing the current within the magnetic field, the wire are subject to the Lorentz force, and this force varies in direction according to the change of current direction. When a current is applied to the inside coil 114 through the inside electrode pad 118, two sides perpendicular to the magnetic field of the external magnetic substances 102a, 102b among the inside coil 114 have currents flowed in opposite direction each other. Therefore, Lorentz forces of different direction by the currents each having opposite direction are applied to the light reflecting means 108 floated by the inside torsion hinge 106, thereby rotation force is created. The light reflecting means 108 is rotated by the inside torsion hinge 106 as an axis. On the contrary, when a current is applied to the outside coil 116 through the outside electrode pad 120, two sides perpendicular to the magnetic field of the external magnetic substances 102a, 102b among the outside coil 116 have currents flowed in opposite direction each other, thereby the aforementioned rotation force is created. The internal frame 110 is rotated by the outside torsion hinge 104 as an axis. In other words, by applying currents to the inside coil 114 and the outside coil 116 formed independently from each other, biaxial driving from the interaction with external magnetic fields can be implemented.

Hereinafter, the method for manufacturing the micro-optical switch according to the preferred embodiment of the present invention will be explained.

FIGS. 3a to 3h shows the plane view explaining the method for manufacturing the micro-optical switch according to the preferred embodiment of the present invention. The method comprises forming the light reflecting means 108 (shown in FIG. 1), outside and inside torsion hinges 104, 106, and the internal frame 110, forming the inside and outside coils 114, 116, and the inside and outside electrode pads 118, 120, and etching the bottom plane of the micro-optical switch.

Figure 3A:
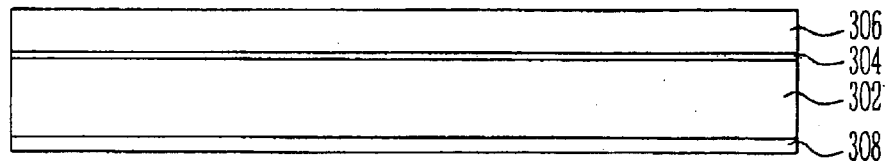
FIGS. 3a to 3h show cross sections for explaining the method for manufacturing the micro-optical switch in accordance with the preferred embodiment of the present invention.

Referring to FIG. 3a, etch stop layer 308 for etching the back plane of SOI (silicon-on-insulator) wafer is deposited on the bottom surface of the SOI wafer. The structure of the SOI sequentially consists of upper layer 306, medium layer 304 and lower layer 302. It is preferable to use the silicon nitride flim or a silicon oxide flim as the etch stop layer 308, and the thickness thereof is preferably 2~3 µm. Also, preferably, the upper layer 306 of the SOI wafer has 75~100 µm, the medium layer 304 has 3~5 µm, the lower layer 302 has 350~450 µm in thickness.

Figure 3B:
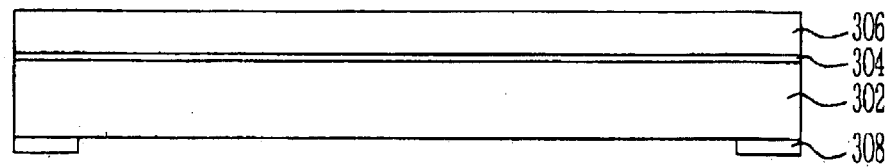

And referring to FIG. 3b, the etch stop layer 308 is patterned and etched by lower photosensitive layer to etch the lower layer 302 of the SOI which will be explained hereinafter. In that time, the etch stop layer 308 is etched such that the light reflecting means is not disturbed in motion of biaxial rotation. The area size to be etched is defined by using dry etching like Deep RIE (Reactive Ion Etching) or using wet etching like KOH etc.

Figure 3C:
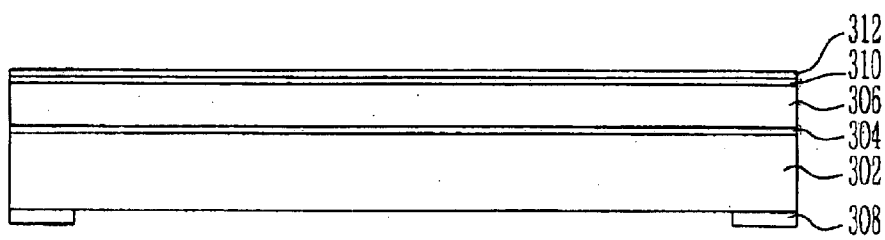

And referring to FIG. 3c, silicon oxide layer 310 for insulation is deposited on the upper side of the SOI wafer. After the upper photosensitive layer 312 is covered on the upper side of the deposited silicon oxide layer 310 to define the shape of the micro-optical switch like internal frame, light reflecting means, inside torsion hinge, and outside torsion hinge etc, photolithography is performed.

Figure 3D:
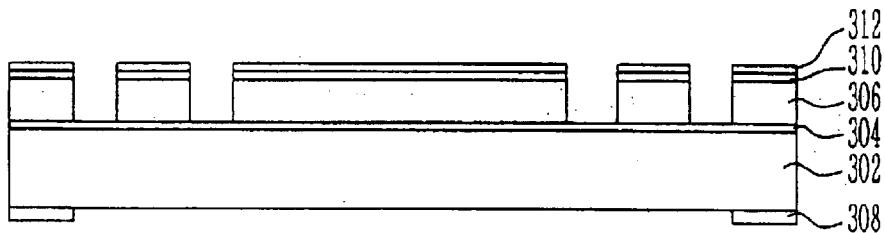

And referring to FIG. 3d, the wafer which has been subject to exposing process is developed with photosensitive solution. The internal frame, light reflecting means, inside torsion hinge, and outside torsion hinge are defined by removing some of the upper layer 306, silicon oxide layer 310, and the upper photosensitive layer 312 with RIE or Deep RIE process. And then the upper photosensitive layer 312 is removed. At this time, the size of the internal frame is preferably, 800×800 µm~1000×1000 µm, the size of the light reflecting means is 500×500 µm, the width of the inside torsion hinge is 20~50 µm, and the width of the outside torsion hinge is 20~50 µm.

Figure 3E:
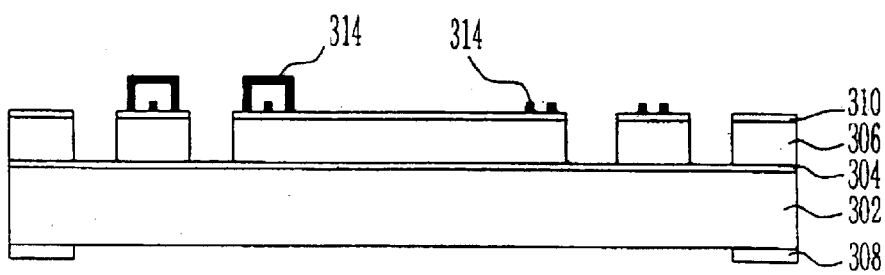

Referring to FIG. 3e, after the seed layer is deposited, photolithography process is performed and the coil and electrode pad 314 are formed on the mold of the photosensitive layer by electroplating. In other words, the inside and outside coils having 5~10 µm in width and 2~5 µm in thickness, inside and outside electrode pads are formed on the upper side of the light reflecting means, internal frame, and the external frame. Coil and electrode pad 314 preferably uses the copper flim which has good conductivity.

Figure 3F:
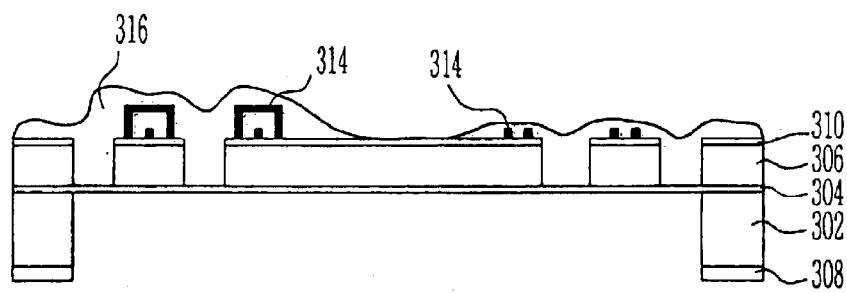

And referring to FIG. 3f, a protection layer 316 is deposited on the upper side of the whole structure. This process means that the protection layer coats the upper side and protects the internal frame, light reflecting means, inside and outside torsion hinges formed on the upper side of the whole structure from being damaged.

And then, the lower layer 302 of the SOI wafer is etched using the etch stop layer 308 as a mask. This is to remove the back plane of the SOI wafer substrate in order to secure the marginal space which can be used for driving the light reflecting means.

Figure 3G:
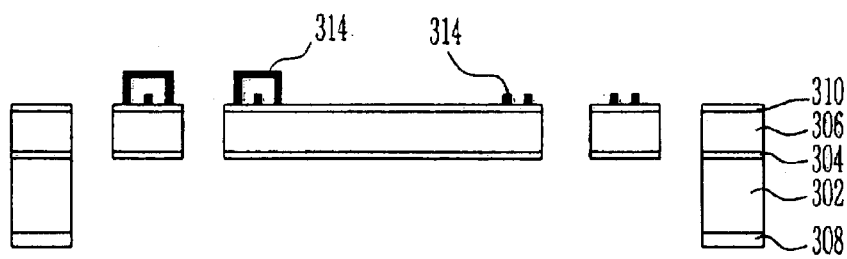

And referring to FIG. 3g, the protection layer 316 is removed, and the medium layer 304 positioned in the upper side of the marginal space is removed. Therefore, the internal frame, light reflecting means, inside and outside torsion hinges of the micro-optical switch according to the one embodiment of the present invention are floated from the substrate. The medium layer 304 can be etched by wet etching or dry etching.

Figure 3H:
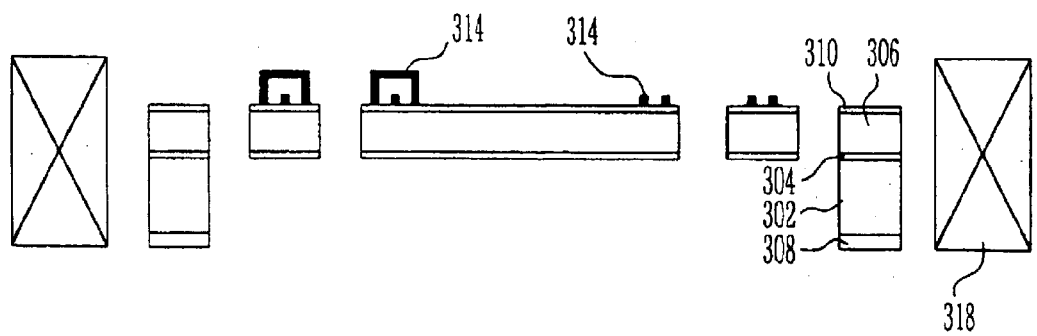

And referring to FIG. 3h, external magnetic substances 318 capable of producing magnetic fields at the right and left side of the optical devices are added in order to drive the manufactured micro-optical switch.

Such micro-optical switch can be manufactured in the OXC (optical cross-connect), OADM (optical add-drop multiplexer), WSXC (wavelength selective cross-connect), etc used in the optical communication through one dimensional or two dimensional arrangement like N×N, 2N, M×N etc, and also can be applied to the device for display with high resolution.

As explained above, the micro-optical switch and the method for manufacturing the same according to the present invention, have the inside and outside torsion hinges with 45° as to the external magnetic field, thereby have the effect like that the light reflecting means can biaxially rotate. And, in the method for manufacturing the coil, it makes the manufacturing process easy and the semiconductor process integrated by utilizing the method for manufacturing a micro inductor, thereby low price production can be achieved.

Although the present invention has been described in conjunction with the preferred embodiment, the present invention is not limited to the embodiment, and it will be apparent to those skilled in the art that the present invention can be modified in variation within the scope of the invention.

What is claimed is:

1. A method for manufacturing a micro-optical switch, the switch comprising:

an external frame having holes inside;

an internal frame positioned in the holes of said external frame and having the holes inside;

a light reflecting means positioned inside the holes of said internal frame;

external magnetic substances positioned at both sides of said external frame;

an outside torsion hinge for connecting said external frame to said internal frame and having 45° to the magnetic field produced by said external magnetic substances;

an inside torsion hinge for connecting said internal frame to said light reflecting means and being perpendicular to said outside torsion hinge;

an outside coil wired in said internal frame; and an inside coil wired in said light reflecting means, wherein said light reflecting means and said internal frame are rotated by said inside torsion hinge and said outside torsion hinge as an axis when a current is applied to said inside coil and said outside coil, wherein the method comprising:

(a) depositing an etch stop layer on the bottom surface of SOI wafer having upper layer, medium layer and lower layer;

(b) removing said etch stop layer except its region defining said external frame;

(c) depositing an insulating layer on said upper layer, and etching said insulating layer and said upper layer by using the mask defining said internal frame, light reflecting means, inside torsion hinge, and outside torsion hinge;

(d) forming said inside coil and outside coil on said insulating layer;

(e) depositing a protection layer on the upper surface of the entire structure, and etching said lower layer using said etch stop layer as a mask; and (f) removing said protection layer, and floating from the lower space of the SOI wafer said internal frame, light reflecting means, inside torsion hinge, and outside torsion hinge by etching said medium layer.

2. A method claimed in claim 1, characterized in that after (f) step, further comprises attaching external magnetic substances to both right and left sides of said SOI wafer.

3. A method claimed in claim 1, characterized in that said etch stop layer consists of a silicon nitride layer or a silicon oxide layer.

4. A method claimed in claim 1, characterized in that said insulating layer is made of a silicon oxide layer.

5. A method claimed in the claim 1, characterized in that said protection layer is made of a polymer layer.

* * * * *